US012164290B2

(12) United States Patent
Geipel et al.

(10) Patent No.: US 12,164,290 B2
(45) Date of Patent: Dec. 10, 2024

(54) METHOD AND ASSISTANCE SYSTEM FOR DETECTING AN ABNORMAL BEHAVIOUR OF A DEVICE

(71) Applicant: Siemens Energy Global GmbH & Co. KG, Bayern (DE)

(72) Inventors: Markus Michael Geipel, Munich (DE); Nikou Günnemann-Gholizadeh, Munich (DE); Sebastian Mittelstädt, Augsburg (DE)

(73) Assignee: Siemens Energy Global GmbH &Co. KG, Munich (DE)

( * ) Notice: Subject to any disclaimer, the term of this patent is extended or adjusted under 35 U.S.C. 154(b) by 416 days.

(21) Appl. No.: 17/618,438

(22) PCT Filed: Jun. 16, 2020

(86) PCT No.: PCT/EP2020/066629
§ 371 (c)(1),
(2) Date: Dec. 11, 2021

(87) PCT Pub. No.: WO2020/254323
PCT Pub. Date: Dec. 24, 2020

(65) Prior Publication Data
US 2022/0253051 A1    Aug. 11, 2022

(30) Foreign Application Priority Data
Jun. 18, 2019 (EP) ..................... 19180909

(51) Int. Cl.
G05B 23/02    (2006.01)
G06F 17/16    (2006.01)
G06N 7/01    (2023.01)

(52) U.S. Cl.
CPC ........... *G05B 23/024* (2013.01); *G06F 17/16* (2013.01); *G06N 7/01* (2023.01)

(58) Field of Classification Search
CPC .......... G05B 23/024; G06F 17/16; G06N 7/01
See application file for complete search history.

(56) References Cited

U.S. PATENT DOCUMENTS 8,055,370 B1    11/2011    Achtnig et al.
2003/0014692 A1    1/2003    James et al.
(Continued)

FOREIGN PATENT DOCUMENTS

GB    2374147 A    10/2002

OTHER PUBLICATIONS

Manabu Kano et al: "Statistical process monitoring based on dissimilarity of process data"; AI CHE Journal, vol. 48, No. 6, pp. 1231-1240, XP055648227; ISSN: 0001-1541, DOI: 10.1002/aic.690480610; 2002.
(Continued)

*Primary Examiner* — Ricky Go
(74) *Attorney, Agent, or Firm* — Wolter Van Dyke Davis, PLLC

(57) ABSTRACT

A method for detecting an abnormal behavior of a device, includes capturing data of at least two different sensors associated to the device within a temporal sequence of time intervals, estimating a relationship between two different sensors for each combination of two different sensors and for each of the time intervals by determining a precision matrix of a multivariate probabilistic model, each matrix element representing the relationship between two sensors, determining a temporal course of the precision matrix by applying the precision matrix of neighboring time intervals with at least one penalty, and identifying an abnormal behavior of the device, if the precision matrix of adjacent time intervals differs by a value larger than an expected threshold value.

14 Claims, 4 Drawing Sheets

(56) References Cited

U.S. PATENT DOCUMENTS

| 2008/0294382 | A1* | 11/2008 | Lim .................. H01L 21/67288 |
| | | | 702/185 |
| 2017/0261972 | A1 | 3/2017 | Vaissiere |
| 2018/0087954 | A1* | 3/2018 | Gonzaga ................... G01F 1/34 |
| 2018/0095004 | A1* | 4/2018 | Ide ........................... G06N 7/01 |
| 2018/0231394 | A1* | 8/2018 | Goh ......................... G01D 3/08 |
| 2019/0163555 | A1 | 5/2019 | Zheng et al. |

OTHER PUBLICATIONS

PCT International Search Report and Written Opinion of International Searching Authority mailed Aug. 13, 2020 corresponding to PCT International Application No. PCT/EP2020/066629 filed Jun. 16, 2020.

* cited by examiner

METHOD AND ASSISTANCE SYSTEM FOR DETECTING AN ABNORMAL BEHAVIOUR OF A DEVICE

CROSS REFERENCE TO RELATED APPLICATIONS

This application is the US National Stage of International Application No. PCT/EP2020/066629 filed 16 Jun. 2020, and claims the benefit thereof. The International Application claims the benefit of European Application No. EP19180909 filed 18 Jun. 2019. All of the applications are incorporated by reference herein in their entirety.

FIELD OF INVENTION

The application refers to an assistance apparatus as well as a method for detecting an abnormal behaviour of a device by capturing data of at least two different sensors associated to the device within a temporal sequence of time intervals.

BACKGROUND OF INVENTION

In various technical fields, there is a need to monitor an operation of machines or devices. Therefore, several sensors are attached or associated with the device which measure physical parameters of the device or of the surrounding of the device over time. For example, electric submersible pumps, as a well-known artificial lift-systems for oil and gas, are provided with a set of sensors which monitor different device parameters such as temperature, bearing load, motor operation or flow rate over time and provide these measurements as sensor data. Monitoring such temporal measurements serves to prove the correct functionality of pumps and is usually done by a domain expert. The domain expert recognises whether the pump is in an irregular or in an anomaly state.

However, this process entails several challenges. First, there is a huge amount of observations created by sensors over time making the manual process regarding the recognition between regular or anomaly state a challenging task. Second, the interaction between the sensor measurements, further called sensor data, are complex and noisy making the interpretation difficult. In addition, it is difficult to recognise which temporal sequence of the data behaves similar and which not. Further on the interaction between the sensors evolve over time comprising latent factors which influence the overall functionality of the device, the system without being consciously considered by a domain expert. Especially when an automatic segmentation which automatically distinguishes between the two different states of anomaly and regular on basis of the various sensor data during a time interval, provides no explainability regarding different sensors and the influence on a regular or anomaly state and how the interaction between the sensors change over time.

SUMMARY OF INVENTION

It is an object of the invention to provide decision criteria and to use these criteria to distinguish abnormal and regular states of a device based on the collected sensor data. A further object is to provide information on the reason for the respective classification and enhance therefore the explainability of the classification.

This object is solved by the method, and by the apparatus according to the claims as follows.

A first aspect of the invention provides a method for detecting abnormal behaviour of a device comprising the steps of capturing data of at least two different sensors associated to the device within the temporal sequence of time-intervals, estimating a relationship between two different sensors for each combination of two different sensors and for each of the time-intervals by determining a precision matrix of a multivariate probabilistic model, each matrix element representing the relationship between two sensors, determining a temporal course of the precision matrix by applying the precision matrix of neighbouring time intervals with at least one penalty and identifying an abnormal behaviour of the device, if the precision matrices of adjacent time intervals differ by a value larger than an expected threshold value.

This method considers the relationship between each combination of two different sensors for each time interval and therefore associates the identification of an abnormal behaviour to changes of the relationship of combinations of physical or other parameters of the device. The larger a change is in the precision matrices of adjacent time intervals, the higher is the probability, that the device changed to an abnormal behaviour. Therefore, dedicated relationships between two sensors can be identified as reason for moving the device into an abnormal behaviour. Therefore, new valid criteria are taken into account for identifying an abnormal behaviour which also provides an improved explainability for this classification. Applying at least one penalty to the precision matrix while determining a temporal course of the precision matrix allows modelling constraints which are assumed to be followed in regular behaviour of the device. Therefore, a penalty models a technical constraint of the device. Thus, the proposed method supports an automated recognition of unusual patterns as well as potential reasons of such anomalies by focusing on the interaction between sensors.

In an embodiment the expected threshold value is determined by evaluating a similarity measure to the precision matrices of adjacent time intervals.

Especially the expected threshold is determined by evaluating the change of the similarity measure of the time series data of adjacent time intervals. This allows an automated, unsupervised learning and definition of the expected threshold values without explicit labelling of the single time intervals by a domain expert. Labelling means assigning to a time interval a label which may have the value "normal" or "abnormal" depending on the behaviour of the different sensors in the considered time interval as regular or abnormal. This allows the training and usage of the method without support of a domain expert.

In a further embodiment the expected threshold value is derived by assigning a label to a time interval, wherein the label indicates a regular or abnormal behaviour of the device during a training phase.

The expected threshold value is especially determined during a training phase of the method based on data of the same sensors as considered during operation phase of the method and identifying regular and abnormal behaviour by assigning to the considered time interval a "regular" or "abnormal" label respectively. Such a definition of the expected threshold value may be more accurate than an expected threshold value determined by evaluating a similarity measure at least in the starting phase where only few time intervals are considered.

In a further embodiment abnormal behaviour is identified, if a matrix element changes from a value of zero to a value different to zero in an adjacent time interval.

A matrix element changing value from 0 to a value different to 0 implies a relation is becoming relevant between two sensors which have not been related so far. This implies a change of a state of the device and may indicate a start of a trend in the device's behaviour caused by a sudden change of the device's physical parameters.

In the further embodiment a clustered time interval is defined by combining adjacent time intervals showing precision matrices with similar elements and segmenting the sensor data into new time intervals according to the clustered time interval.

This allows the identification of larger time intervals showing the same type of device behaviour with respect to abnormal or regular behaviour of a device. A change from a clustered time interval to a "not clustered" time interval or a clustered time interval showing different similar elements can provide an indication to an anomaly of the monitored device. This facilitates classifying the behaviour of the device into different states not only with respect to regular or abnormal, but also with respect to similar relation between the sensors. For example, if the temperature the device is exposed to rises, the pressure may rise also within a specific delay in time. All time intervals showing this related behaviour are combined to form a clustered time interval. Upcoming time intervals of temperature and pressure sensor data showing the same course will be combined to a cluster time interval indicating the same reason.

In a further embodiment a first penalty is set, which generates smoothness of matrix elements in adjacent time intervals when applied to the precision matrix.

In a further embodiment hidden features are identified in the at least two temporal sequences of data by setting a second penalty, which generates a sparse and low-rank precision matrix when applied to a precision matrix.

With the first and second penalties the expected or forecasted change of relationships between sensors are controlled. The first penalty generates smoothness of the matrix elements. During normal behaviour of the device smoothness showing uniform and steady temporal course of sensor data is expected. Sudden changes between different sensors and therefore physical parameters are not expected in regular behaviour of the device. If in an actual time interval sensor data shows less smoothness then expected by the provided penalty, the observed difference between the precision matrices of adjacent time interval will increase.

The second penalty applied to the precision matrix generates sparse and low rank precision matrix. If in adjacent time intervals the precision matrix shows a new, additional matrix element this indicates to a new relation between two sensors and points to a sudden change caused by a hidden feature.

In a further embodiment the hidden features are taken into account in defining the clustered time intervals by correlating the first penalty and the second penalty.

This allows the segmenting of the sensor data into regular or anomaly clustered time intervals.

In a further embodiment the relationships between two different sensors are visualized for each combination of two different sensors in a graph, wherein representing each sensor by a node, each matrix element by a line connecting the respective nodes and representing the value of each matrix element by an attribute assigned to the line.

Such a visualization of the relationships, called network or graph, between the different sensors supports a domain expert in interpreting the actual temporal course of the sensor data. A new or different line between two nodes in the graph indicate a new relationship and provides a reason for e.g. unusual temporal course of the various sensor data. It supports in distinguishing an abnormal behaviour from a regular behaviour, e.g. based on a change in the settings of the device parameters or influenced by environmental changes. Showing each sensor as a node, determined relationships by a line connecting the respective nodes and the value of the relationship by an attribute assigned to the line, for example thickness of the line, allows an easy interpretation of all relevant factors.

In a further embodiment the hidden features are additionally visualized and the at least one sensor influenced by the hidden features is indicated.

This facilitates the interpretation of the source of a relationship and the reason causing this relationship.

In a further embodiment the graph is visualized only in such a time interval, in which the graph differs from the graph of the previous time interval.

This facilitates observing sudden or unexpected changes as only such changes are visualized at all.

In a further embodiment the device comprises a pump and the time series data comprise at least one of motor temperature of the pump, and inlet temperature of the pump, an operating power of the pump, a pressure inside the pump, a pressure outside the pump, a bearing load or a medium flow rate.

Maintenance of a pump and especially electric submersible pumps require considerable time and is accompanied by loss of income during the maintenance phase. Therefore, it is a big advantage when the condition of the pump can be determined precisely without a shutdown of the pump. Therefore, such a method optimises the maintenance cycles and the revenue created by such a pump.

A second aspect of the invention relates to an assistance apparatus for detecting an abnormal behaviour of a device, comprising at least one processor configured to capture data of at least two different sensors associated to the device within the temporal sequence of times intervals, estimate a relationship between two different sensors for each combination of two different sensors and for each of the time intervals by determine a precision matrix of a multivariate probabilistic model, each matrix element representing a relationship between to sensors, determine a temporal cause of a precision matrix by applying the precision matrix of neighbouring time intervals with at least one penalty and identify an abnormal behaviour of the device, if the precision matrix of adjacent time intervals differs by a value larger than an expected threshold value.

The assistance apparatus supports the operation and maintenance of the device by providing information about a regular or an anomaly state of the device. Especially the operator takes into account dependencies between the different sensor entities.

In a further embodiment the assistance apparatus comprises a display unit configured to visualize at least one of the relationships between two different sensors for each combinations of two different sensors in a graph, wherein representing each sensor by a node, each matrix element by a line connecting the respective nodes and representing the value of the matrix element by an attribute assigned to the line, the hidden features and indicating operators the at least one sensor influenced by the hidden features.

The display unit of the assistance allows the visualization of the estimated and determined relationships of sensors and sensor data and the hidden features in an intuitive representation by graph consisting of nodes representing the sensors and line between them showing the dependencies as well as the value of the dependency for example by sickness of the line or by an applied colour code to the line or by an indication in numbers and letters of the line.

Further means of presenting the value of the relationship are also covered. Visualising also the hidden features and indicating the sensors influenced by the hidden features causing the hidden features improves the explainability of the dependency and observing the reason for the relationship.

A third aspect of the invention relates to a computer program product comprising a non-transitory computer readable medium that stores computer executable codes that, when executed to a processor, performs the method as described before.

The invention will be explained in more detail by reference to the accompanying Figures.

DETAILED DESCRIPTION OF INVENTION

All methods and method steps can be implemented by corresponding means which are adapted for performing the respective method steps. All functions provided by particular means can be a method step of the method.

The scope of protection is given by the claims and not restricted to features discussed and the description as shown in the Figures.

More and more devices, e.g., in automation plants or energy systems are provided with a set of sensors which measure different parameters like temperature, bearing load, motor operation, or flow rate over time. The sensors provide these data in sequences of time intervals to monitor the device and serve to prove the correct operation of the device. The interpretation of the time series of sensor data is usually done by a domain expert. The method provides an automated detection of abnormal behaviour of device with only minor support or no support at all of a domain expert. The time intervals of the sensor data are further combined into clustered time intervals of similar behaviour. An abnormal behaviour can be differentiated into different states of the device for example "high load", "diagnosis mode", and further.

The inventive method is based on the evaluation of the relationship between each combination of two different sensors and the evolution of this relationship over time. The method is performed by a computer wherein the expression computer shall be interpreted broadly specially to cover all electronic devices with data processing ability. The computer can be a personal computer, a server, a handheld computer system, a pocket PC, or any processor and further electronic devices for data processing. As far as following description does not indicate anything different, actions like "capturing", "estimating", "determining", "identifying" and thereon are related to activities of processes or processing steps, which change or generate data or transfer data into different data, wherein data implies a physical parameter, especially electronic signals.

Figure 1:
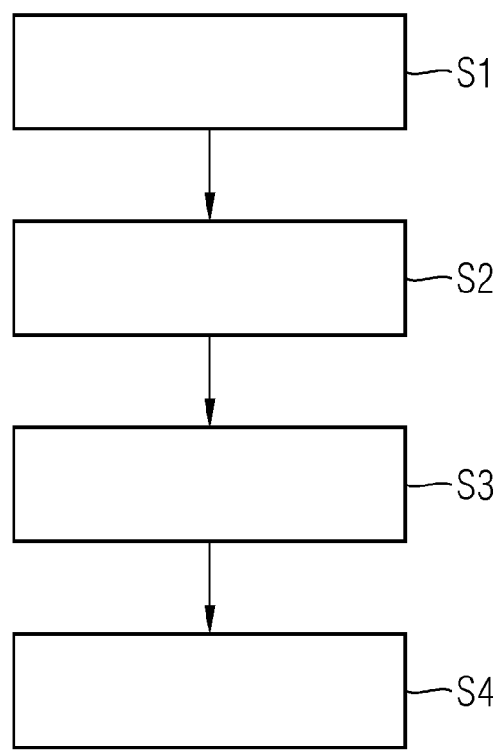
FIG. 1 shows an embodiment of the inventive method by a flow diagram.
Figure 2:
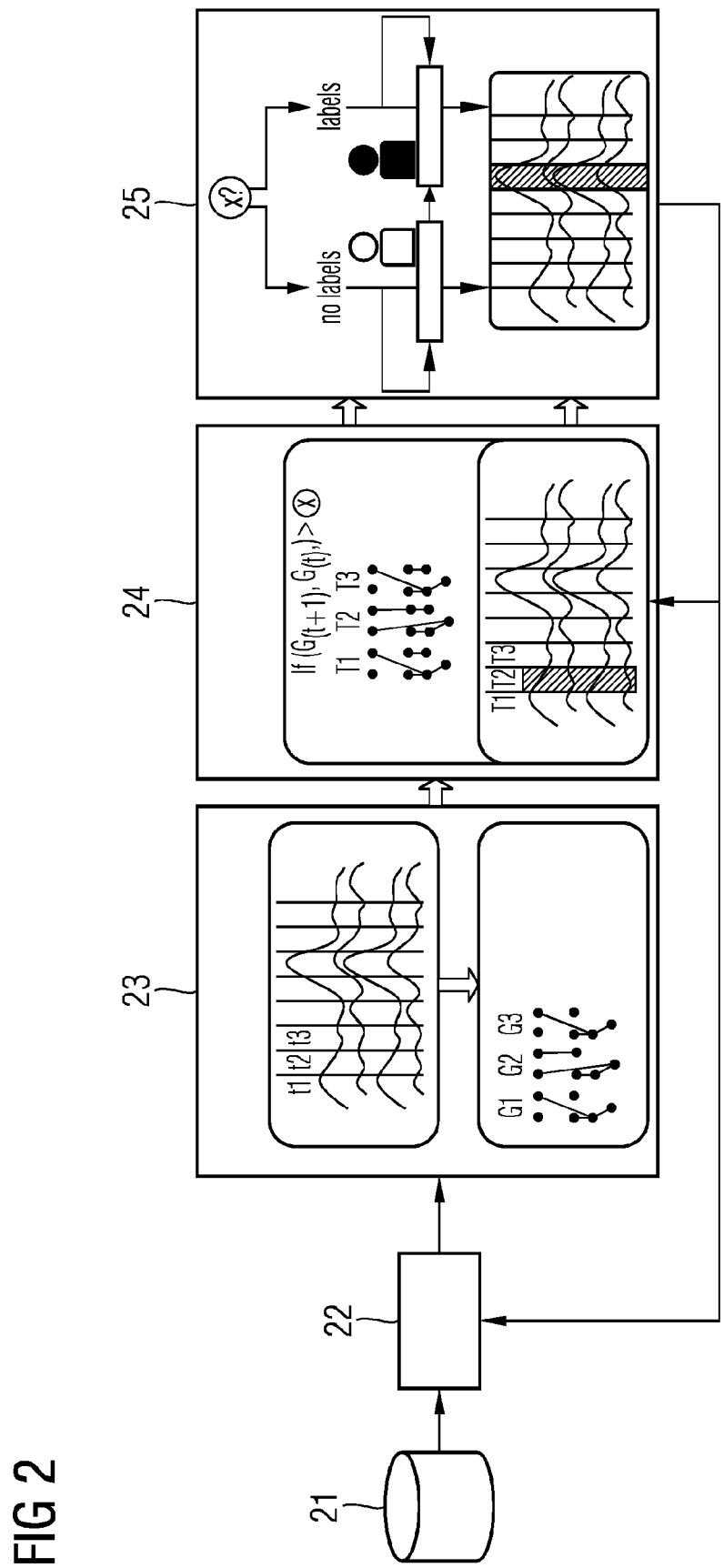
FIG. 2 shows an embodiment of the method in the training phase in schematic representation.

FIG. 1 shows the method steps for detecting abnormal behaviour of a device as a flow chart. FIG. 2 visualizes the sensor data and graphs resulting of the various method steps. In the first step S1, data of at least two different sensors associated with a device which shall be monitored, are captured within a temporal sequence of time intervals. The sensor data is for example collected in a database 21 and pre-processed and normalised in a pre-processing unit 22 as shown in FIG. 2. As an example, sensor data of four different sensors are captured in a temporal sequence of time intervals t1, t2, t3. The sensor data sequences are shown in the upper part of box 23.

In the next step S2, see FIG. 1, a relationship between two different sensors for each combination of two different sensors and for each of the time intervals is estimated by determining a precision matrix of a multivariate probabilistic model, each matrix element representing the relationship between two sensors. In FIG. 2 these estimated relationships are visualized by a graph G1, G2, G3 for each of the intervals t1, t2, t3 in box 23. Each graph G1, G2, G3 shows the sensors in form of a network, wherein each node of the network represents a sensor and a line or edge between two nodes represents a relationship between the two nodes, i.e. respective sensors.

In the third step S3 of FIG. 1 a temporal course of the precision matrix is determined by applying to the precision matrix of neighbouring time intervals at least one penalty. A penalty is a function which is defined to be applied to the multivariate probabilistic model to realise the desired performance and the temporal behaviour of the sensor data. It is assumed that in regular behaviour the sensors data values evolve smoothly over time. This is realised by applying a penalty to the precision matrix to encourage the smoothness.

At least in step S4 of FIG. 1 an abnormal behaviour of the device is identified if the precision matrix of adjacent time intervals T1, T2 or T2, T3 differs by a value larger than an expected threshold value X. A regular behaviour can be warranted based by the fact that most of the adjacent time intervals have identical relationships between the different combinations of sensors and therefore show the same structure of a network in the graph of adjacent time intervals. Any suspicious temporal variation in the structure of the network of graphs of adjacent time intervals, such as smoothed shift of network or a node rewiring its connection, can be interpreted as an anomaly.

FIG. 2 depicts the identifying step S4 and the clustering of adjacent time intervals t1, t2, t3 with similar behaviour into clustered time intervals T1, T2, T3 in more detail. In the depicted case the graph T2 shows a different wiring than the graph T1 of the preceding time interval T1 see upper part in box 24. This different wiring relates to a difference in the precision matrix of adjacent time interval T1 and T2. Therefore, time interval T2 is identified showing an abnormal behaviour of the device. This information can for example be highlighted in the visualized representation of the time series as shown in the lower part of box 24. This information can be provided to a monitoring center and/or an alarm or signal can be created to indicate this abnormal behaviour. The clustered time interval T1, T2 can be can comprise one or several adjacent time intervals showing the same relationships of the sensors data and therefore the same network in its graph respectively.

The expected threshold value x can be determined by evaluating a similarity measure to the precision matrix of adjacent time intervals. This determination of the expected threshold value x can be performed, e.g., by an unsupervised automatic learning. As an example of a similarity measure, for each pair of adjacent time intervals of a multitude of adjacent time intervals a distance is evaluated representing the change in the precision matrices of adjacent time intervals. The distance with the highest value out of evaluated distances is determined as expected threshold x. This is especially relevant, if no labels of a domain expert are available which can be assigned to the considered adjacent time intervals.

The expected threshold value can also be determined, if such labels are assigned by a domain expert to at least several time intervals. E.g., only time intervals showing regular behaviour are labelled, i.e. all labelled as "normal". The expected threshold is determined by ensuring that all these time intervals are recognized as "normal", i.e. no anomaly. This is partially supervised learning approach for the expected threshold.

If time intervals showing normal and abnormal behaviour are labelled, the expected threshold is determined such, that the time intervals with different labels are well separated. This is a supervised learning approach.

As a further possibility a value for the expected threshold value can be set without support by an algorithm, i.e., "manually".

The determination of the expected threshold value can be performed especially during a training phase of the model. In box 25 of FIG. 2, the determination of the expected threshold using labels is indicated on the right upper part indicated by a reference "wL". The required support of an expert having domain knowledge is indicated by the completed pictogram. The determination of the expected threshold using no labels, is indicated by a reference "no labels" on the left upper part. The required support of an expert having knowledge in data science is indicated by the not filled pictogram.

During operation of the method, the identification of abnormal behaviour and also of regular behaviour in step S4 is used to improve the performance of the probabilistic model. An improved model is applied to multivariate temporal data of future sequences of time intervals.

The interaction of sensors can be influenced by noise or the presents of hidden features in a certain time interval. Such hidden features can affect the observable sensors behaviour and, hence, it can affect the relationship of the sensors between each other. The consideration of such hidden features, e.g. for examples in a pump system, can be supportive with regard to automated decision whether a detected anomaly in the observed temporal sensor data is abnormal because a pump is defect or the anomaly should be ignored since the hidden feature misrepresent the actual regular behaviour of the measured sensor data. Such a hidden feature can be estimated by a second penalty embedded in the model which produces both sparse and low-rank componence of the precision matrix for each time interval.

Figure 3:
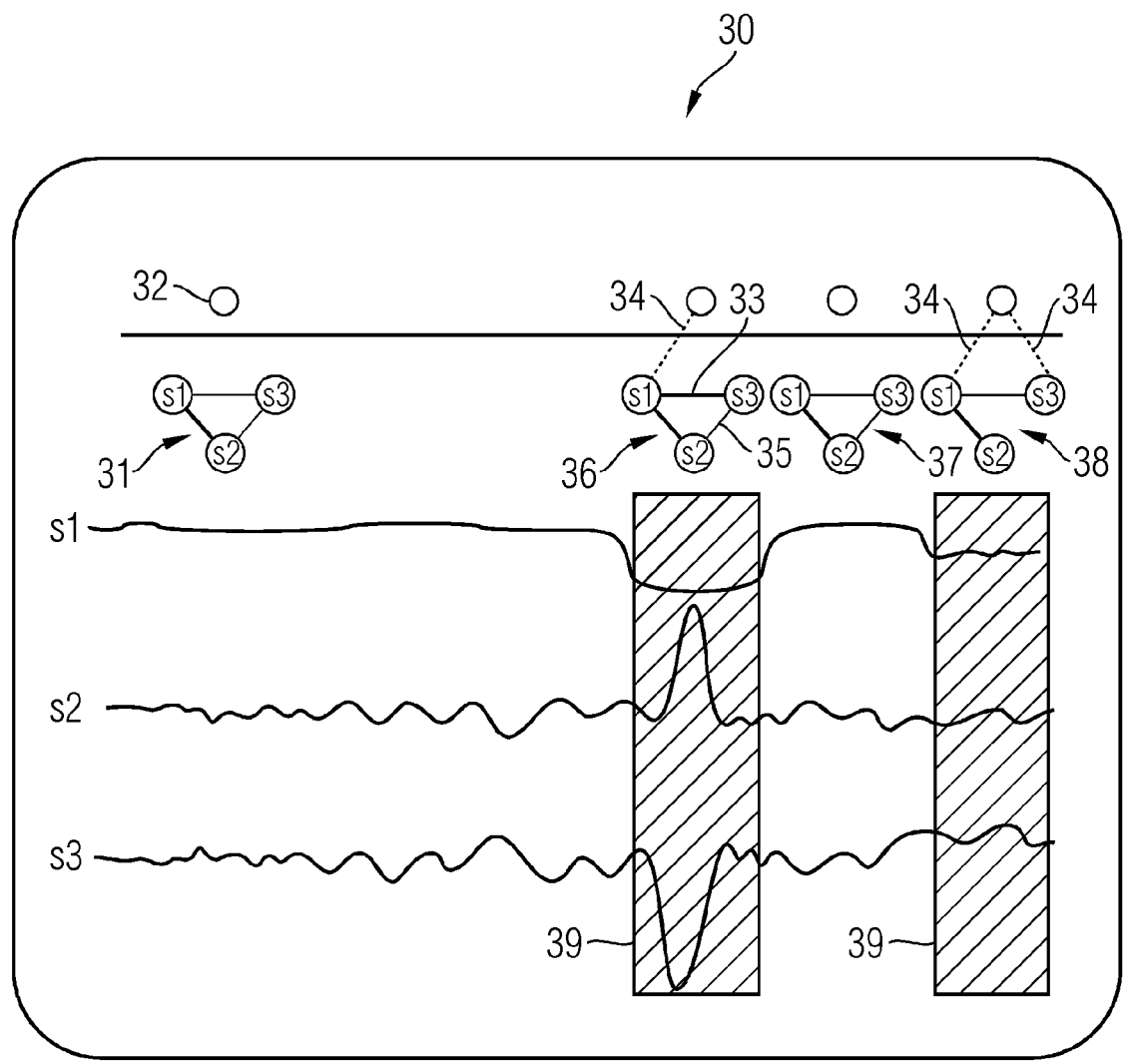
FIG. 3 shows an embodiment of the inventive assistance device, especially a display unit showing visualized graphs in schematic form.

FIG. 3 shows an embodiment of the inventive assistance device, especially a display unit 30 showing temporal series of several, here three, different sensor data s1, s2, s3 and the determined graph as a network of sensors and the relationships between each other.

Visualising the relationships between each combination of different sensors provides an explainability to a domain expert regarding the interactions between the different sensors over time. However, only networks with relevant changes shall be visualized to avoid overwhelming a user.

For each time interval a graph 31 is provided showing a network of nodes representing the different sensors s1, s2, s3. Determined relationships are visualized by connection lines between the considered nodes. For each time interval and graph also one or several influencers 32 are represented. Such an influencer 32 is identified to cause the relationship between the sensors. If it is deduced that the influencer 32 influences for example sensor s1, this influence is represented by a doted connection, see e.g. line 34 in graphs 36, 38. A strong relation is indicated by a thick line as shown, e.g. in graph 36 for the relationship 33, wherein a weak relationship is represented by a thin connection line, see line 35 in graph 36.

The time intervals in the left half of the display unit 30 are combined to a clustered time interval and only one graph 31 is depicted because the sensor data in this time intervals show the same behaviour. In a time interval associated with graph 36 the relationship between s1 and s3 changed to strong compared to graph 31. In a time interval associated with graph 37 the relationship between sensors s1 and s3 changed to weak. In the time interval associated with graph 38 there exists no relationship between sensors s2 and s3. The precision matrix determining graph 36 and 38 differ by a higher value than the expected threshold value from the precision matrix of the respective preceding time interval, so these intervals are marked, see reference sign 39 indicating abnormal behaviour of the monitored device.

In graph 38 an influence of influencer 32 is identified and visualized by dotted line 34. Influencer 32 now also influences sensor s3 and causes the classification as "abnormal" behaviour in the associated time interval. By this information a domain expert receives additional information about the source of this abnormal behaviour. This enhances the confidence in the applied method and allows to deduce the source of this behaviour.

Figure 4:
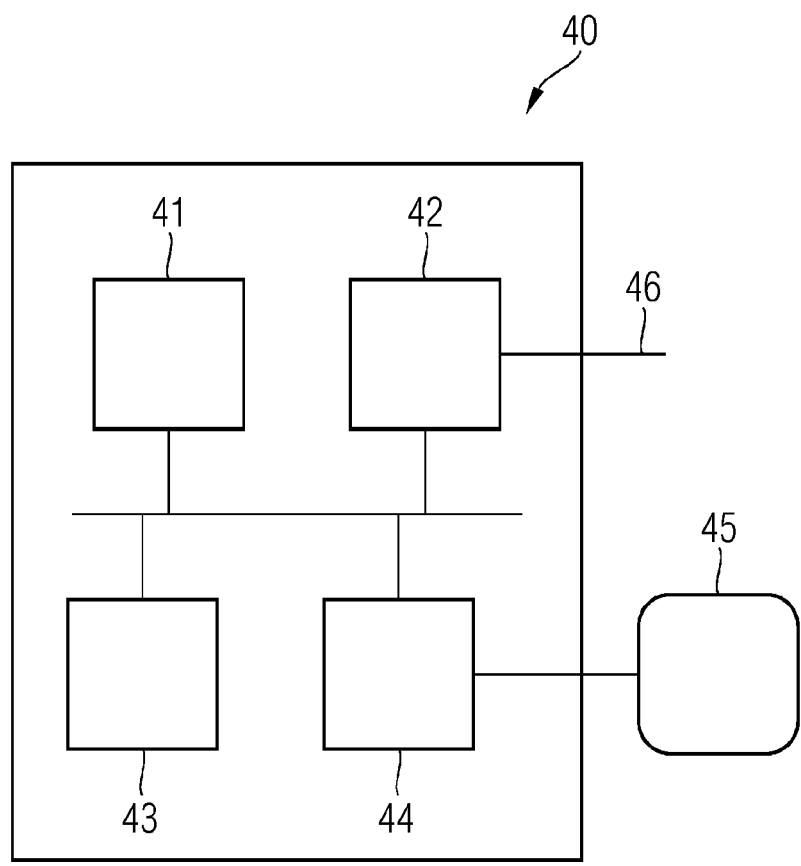
FIG. 4 shows a visualization of the analysed sensor data which is for example presented on the display unit of the assistance apparatus.

FIG. 4 shows an assistance apparatus 40 which is configured such to perform the described method and therefore detecting an abnormal behaviour of a device. The assistance apparatus 40 comprises an input unit 42 for capturing data measured by sensors associated to the device and provided by a data connection 46. The data connection can be a wireline or wireless connection. The assistance apparatus 40 further comprises in estimator 41 which is configured to estimate a relationship between two different sensors for each combination of two different sensors and for each of the time intervals, by determining a precision matrix of a multivariate probabilistic model, each matrix element representing a relationship between two sensors.

The assistance apparatus 40 further comprises a determinator 43 configured to the determine a temporal course of the precision matrix by applying the precision matrix of neighbouring time intervals which at least one penalty. Further it comprises an identifying unit 44 configured such to identify an abnormal behaviour of the device, if the precision matrices of adjacent time intervals differ by a value larger than an expected threshold value.

The estimator 41, input unit 42, determinator 43 and the identifying unit 44 can structured as one single processor or can structured as several different processors or other hardware components, such as digital processors or programmable circuits. The assistance apparatus 40 comprises a display unit 45 to visualize the graphs and temporal sequences of time intervals or sensor data as shown in FIG. 3. Therefore, the display unit 45 can visualize at least the relationships between two different sensors for each combination of two different sensors in a graph and also hidden features indicating the sensors which are influenced by these hidden features.

By the invention, recognizing trends and anomalies are achieved by a range of possible sudden changes in the structure of graphs and the shown network, such as entire shift of network structure or sudden changes regarding the connections between single nodes. Explainability is achieved by estimating a time varying network which shows the relationship between different features and how the relationship is changed over time. This avoids misinterpretation of results influenced by noise or hidden external features by excluding such factors while inferring a network form the measured sensors. The provided method has the advantage that no labelled data or explicit domain knowledge is required in the starting phase where only sensor data of few time intervals are available. This multivariate probabilistic model provides artificial intelligence applied in new use cases such as preventive maintenance which are built incrementally via the interaction with a domain expert. The identification of abnormal behaviour is explainable and therefore provides more confidence to the applied method.

The invention is not limited to the described examples. The invention also comprises all combinations of any of the described or depicted features.

The invention claimed is:

1. A method for detecting an abnormal behavior of a device, comprising:
    capturing data of at least two different sensors associated to the device within a temporal sequence of time intervals,
    estimating a relationship between two different sensors for each combination of two different sensors and for each of the time intervals by determining a precision matrix of a multivariate probabilistic model, each matrix element representing the relationship between two sensors,
    setting a first penalty, which generates smoothness of matrix elements in adjacent time intervals when applied to the precision matrix,
    determining a temporal course of the precision matrix by applying the precision matrix of neighboring time intervals with at least the first penalty, and
    identifying an abnormal behavior of the device, if the precision matrices of the adjacent time intervals differ by a value larger than an expected threshold value.

2. The method according to claim 1,
    wherein determining the expected threshold value comprises evaluating a similarity measure to the precision matrices of the adjacent time intervals.

3. The method according to claim 1,
    wherein the expected threshold value is derived by assigning a label to a time interval, wherein the label indicates a regular or abnormal behavior of the device during a training phase.

4. The method according to claim 1,
    wherein the abnormal behavior is identified, if a matrix element changes from a value of zero to a value different to zero in the adjacent time interval.

5. The method according to claim 1, further comprising:
    defining a clustered time interval by combining the adjacent time intervals showing precision matrices with similar elements and segmenting the sensor data into new time intervals according to the clustered time interval.

6. The method according to claim 5, further comprising:
    identifying hidden features in at least two temporal sequences of data by setting a second penalty, which generates a sparse and low rank precision matrix when applied to the precision matrix.

7. The method according to claim 6, further comprising:
    taking the hidden feature into account in defining the clustered time interval by correlating the first penalty and the second penalty.

8. The method according to claim 7, further comprising:
    visualizing the relationships between two different sensors, for each combination of two different sensors in a graph, by representing each sensor by a node, each matrix element by a line connecting the respective nodes and representing the value of each matrix element by an attribute assigned to the line.

9. The method according to claim 8, further comprising:
    additionally visualizing the hidden features and indicating the at least one sensor influenced by the hidden features.

10. The method according to claim 8, further comprising:
    visualizing the graph only in such a time interval, in which the graph differs from the graph of the previous time interval.

11. The method according to claim 1,
    wherein the device comprises a pump and the time series data comprise at least one of: a motor temperature of the pump, an inlet temperature of the pump, an operating power of the pump, a pressure inside the pump, a pressure outside the pump, a bearing load, a medium flow rate.

12. A non-transitory computer readable medium comprising computer executable code stored thereon that, when executed on a processor, performs the method as claimed in claim 1.

13. An assistance apparatus for detecting an abnormal behavior of a device, comprising
    at least one processor configured to:
        capture data of at least two different sensors associated to the device within a temporal sequence of time intervals,
        estimate a relationship between two different sensors for each combination of two different sensors and for each of the time intervals, by determining a precision matrix of a multivariate probabilistic model, each matrix element representing a relationship between two sensors,
        setting a first penalty, which generates smoothness of matrix elements in adjacent time intervals when applied to the precision matrix,
        determine a temporal course of the precision matrix by applying the precision matrix of neighboring time intervals with at least one penalty, and
        identify an abnormal behavior of the device, if the precision matrices of the adjacent time intervals differ by a value larger than an expected threshold value.

14. The assistance apparatus according to claim 13, further comprising:
    a display unit configured to visualize at least one of:
        the relationships between two different sensors for each combination of two different sensors in a graph, wherein representing each sensor by a node, each matrix element by a line connecting the respective nodes and representing the value of each matrix element by an attribute assigned to the line, the hidden features and indicating the at least one sensor influenced by the hidden features.

* * * * *